Nov. 7, 1967   R. M. DAVIS   3,351,769
STATIC SWITCHING SYSTEM WITH A SINGLE MEANS FOR SELECTING
ANY OF A PLURALITY OF D.C. LOADS TO BE SUPPLIED
Filed Aug. 3, 1964   3 Sheets-Sheet 1

United States Patent Office 3,351,769
Patented Nov. 7, 1967

3,351,769
STATIC SWITCHING SYSTEM WITH A SINGLE MEANS FOR SELECTING ANY OF A PLURALITY OF D.C. LOADS TO BE SUPPLIED
Rex M. Davis, Loughborough, England, assignor to Brush Electrical Engineering Company Limited, Loughborough, England
Filed Aug. 3, 1964, Ser. No. 387,099
17 Claims. (Cl. 307—38)

ABSTRACT OF THE DISCLOSURE

In order to save weight and volume of a static switching system for selecting any of a plurality of D.C. loads, use is made of a single means for selecting the load to be connected in circuit. The invention relates to means in combination with which a single silicon controlled rectifier (S.C.R.), or another switching device with similar conducting, switching and non-conducting characteristics (e.g., a thyratron), may be used to connect or disconnect a load and a D.C. supply, the means being adapted to allow the switchnig device to regain its forward blocking condition at, or shortly after, the removal of a control signal applied to its control electrode.

Existing methods for providing turn-on, or turn-off control for an S.C.R. in a D.C. circuit fall into two classes:

(1) Methods which use a charged capacitor and an auxiliary S.C.R. to turn off the S.C.R. which controls the load.

(2) Methods which do not use an auxiliary S.C.R. but which use a charged capacitor and a switching circuit or another type of switching device to turn off an S.C.R. which controls the load. A saturating choke and a resonant circuit are two examples of suitable switching circuits, while transistors and mechanical contacts are examples of suitable switching devices.

Where several loads must be controlled and supplied from a single D.C. supply, the provision of each load-controlling S.C.R. with its own turn-off facilities, of whatever type, is wasteful of space and unnecessarily complex and uneconomic. The present invention mitigates these disadvantages.

According to the invention a static switching system for a plurality of D.C. loads includes respective static switching devices to connect and disconnect the loads and a D.C. supply, and means interposed between the D.C. supply and the loads with their respective static switching devices to cause a reverse voltage to be applied to all of the said static switching devices, the reverse voltage being of longer duration than the turn-off time of the static switching device last to achieve the turned-off condition.

According to a feature of the invention each static switching device is a silicon controlled rectifier, or is another kind of device having conducting, switching and non-conducting characteristics similar to a silicon controlled rectifier.

According to a further feature the means for reversing the voltage applied to each static switching device includes a choke in one of the D.C. lines, and means operable momentarily to connect the load end of the choke, either directly or indirectly to the other D.C. line.

In such a case, and according to a further feature, the means operable momentarily to connect the load end of the choke to said other D.C. line can include a silicon controlled rectifier connected between the load end of the choke and the said other D.C. line, and a series resonant circuit in parallel with the silicon controlled rectifier such that the peak resonant current exceeds the maximum current flow through the choke.

According to yet a further feature the means for reversing the voltage applied to each static switching device includes a choke winding in each of the D.C. lines, and means operable to connect together momentarily, directly or indirectly, the load ends of the said windings. The latter can have separate magnetic cores or they can share a common one.

In such a case, and according to a further feature, the means operable to connect together momentarily the load ends of the said two windings can include a silicon controlled rectifier connected between the load ends of the said two windings, and a series resonant circuit in parallel with the silicon controlled rectifier such that the peak resonant current exceeds the maximum current flow through the choke windings.

According to a still further feature the means causing the reverse voltage to be applied to each static switching device, itself embodies at least one static switching device which is supplied with trigger pulses at a substantially constant frequency.

Alternatively, and according to yet another feature, the means causing the reverse voltage to be applied to each static switching device, itself embodies at least one static switching device which is supplied with a trigger pulse at the instant when any one or more of the loads is to be disconnected from the supply.

Figure 1:
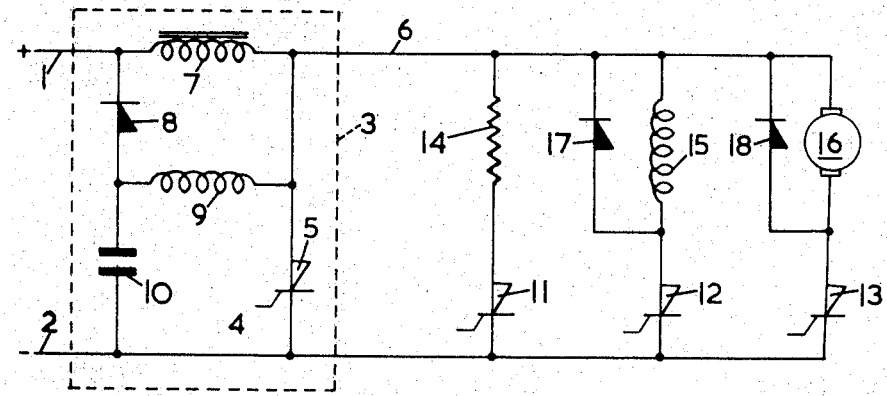
FIGURE 1 shows, by way of example, a static switching system according to the invention.
Figure 3:
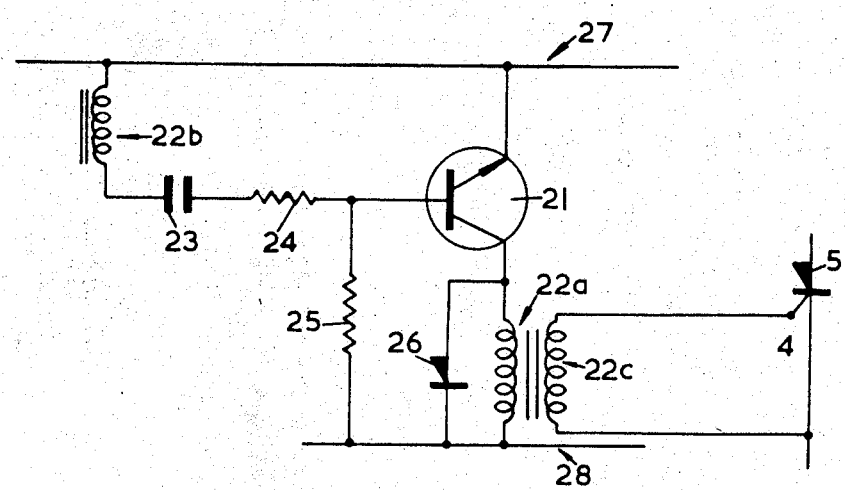
FIGURE 3 shows a circuit for providing triggering pulses to the "means" shown in FIGURES 1 and 2.

Referring to FIGURE 1, the positive and negative terminals of the D.C. supply are shown at 1 and 2 respectively. The dotted rectangle 3 encloses a circuit which constitutes the "means" to be combined with the switching device and which, each time the gate of S.C.R. 5 is supplied with a positive triggering pulse, momentarily makes the polarity of the line 6 negative with respect to supply line 2. The circuit for providing the triggering pulses which is shown in FIGURE 3, provides the gate 4 of S.C.R. 5 with regularly spaced trigger pulses from the free-running blocking-oscillator shown.

Three typical loads are shown at 14, 15 and 16, these being resistive, inductive, and a motor armature respectively. Any of these loads may be switched on and kept on by providing a continuous control signal of sufficient amplitude to the gate of the S.C.R. 11, 12, or 13 to which it is connected. In the case of the resistive load 14 alone the momentary reversal of polarity of the potential at 6 with respect to the supply line 2 will cause a momentary interruption of current, which is of no consequence.

In the case of the inductive load 15, or the motor armature 16, both contain sufficient inductance for the load current to continue flowing even when the potential at 6 is momentarily reversed. Diodes 17 and 18 respectively are therefore associated with these loads to provide an alternative path for the load currents during the momentary reversal of potential at 6, and also to ensure that this reversal of potential does appear across the S.C.R.'s 12 and 13.

When it is desired to switch off one of the loads 14, 15 or 16, say load 15, it is only necessary to remove the control signal to the gate of S.C.R. 12. At the occurrence of the next reversal of polarity at 6, S.C.R.'s 11, 12 and 13 will experience a reversal of anode voltage, of a duration longer than their turn-off times and hence in the absence of the control signal to S.C.R. 12 the latter will turn off and the current in load 15 will collapse.

The manner in which the reversals of potential are generated by the circuit enclosed in rectangle 3 will now be described. Immediately before a reversal, capacitor 10 is charged with its upper plate at the potential of the positive supply 1, through choke 7 and inductance 9. When S.C.R. 5 is triggered ON by a positive pulse on its gate 4, the current flowing through choke 7, which would otherwise flow to the loads 14 and/or 15 and/or 16, is diverted into S.C.R. 5. In addition, a resonant current whose peak value must exceed the maximum load current, builds up in clockwise direction (in the figure) through the capacitor 10, inductance 9 and S.C.R. 5 because the upper plate of the capacitor 10 is charged to the same potential as line 1. In the third quarter cycle of resonant oscillation, this resonant current flows through S.C.R. 5 in the opposite direction to the by-passed load current and when the resonant current exceeds the by-passed load current, S.C.R. 5 is extinguished. The potential at 6 is now approximately equal to the negative potential remaining on the upper plate of capacitor 10 which now carries the by-passed load current instead of it being carried by S.C.R. 5. Capacitor 10 therefore charges up so that the potential on its upper plate equals that at supply line 1, after which a current path exists for any decaying current through inductance 9, diode 8 and choke 7. Choke 7 is necessary to sustain the large voltage which occurs during the period of zero and reverse potential on line 6.

Figure 2:
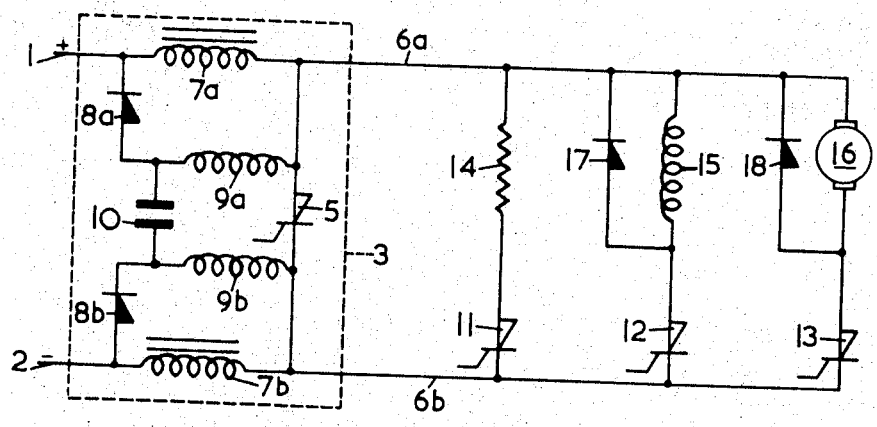
FIGURE 2 shows, by way of example, another static switching system according to the invention.

Referring to FIGURE 2 the dotted rectangle 3 is an example of another circuit which constitutes the "means" to be combined with the switching devices and which each time the gate of S.C.R. 5 is supplied with a positive triggering pulse momentarily makes the polarity of the line 6A negative with respect to the line 6B.

The choke windings 7a, 7b are disposed one in each of the supply lines 1 and 2; the inductance 9 is also split into two parts 9a and 9b and these together with capacitor 10 from the series resonant circuit which is connected in parallel with the S.C.R. 5; and each choke winding 7a, 7b has associated with it a diode 8a and 8b respectively.

The operation of the "means" shown in the rectangle 3 of FIGURE 2 is precisely similar to that of the circuit shown in the rectangle 3 of FIGURE 1 except that the circuit of FIGURE 2 operates in a balanced manner about an imaginary mid-wire whose potential is halfway between the potentials of supply line 1 and supply line 2.

FIGURE 3 shows a transistor blocking-oscillator suitable for providing a train of regularly spaced trigger pulses for S.C.R. 5.

During the interval between the trigger pulses, transistor 21 is held in the OFF condition by the negative charge on the right-hand plate of capacitor 23. The latter is discharged through resistors 24 and 25 to the positive supply line 28 and after this OFF period, which is dependent on the resistor and capacitor values, the base of transistor 21 will become positively biased through resistor 25. At this instant transistor 21 will begin a conduct and hence its collector potential will fall, causing a voltage to appear across the primary winding 22a of the blocking-oscillator transformer. Hence a voltage will also appear across the feedback winding 22b of the said transformer in such a direction as to make the left-hand plate of capacitor 23 positive with respect to the other supply line 27. This gives rise to a cumulative action which forces transistor 21 to go into the fully conducting state. During the ON period the base current for transistor 21 is supplied from the feedback winding 22b through the capacitor 23, the left-hand plate of which is therefore positively charged while the base current to transistor 21 is decaying. At the end of the ON period there will be insufficient base current through resistor 24 and resistor 25 to maintain transistor 21 in a conducting state for the collector current it is now carrying. The transistor will therefore no longer be in the fully conducting state and hence the voltage across the primary winding 22a and feedback winding 22b will be reduced. This further reduces the base current in the transistor 21 which therefore rapidly switches to the OFF state which is maintained by the negative charge on the right-hand plate of capacitor 23. The ON period of transistor 21 is therefore governed by the charging time of capacitor 23, and the duration of the OFF period of transistor 21 is governed by the discharge time of capacitor 23.

A train of pulses appears across the secondary winding 22c and these are applied between the gate electrode 4 and the cathode of S.C.R. 5. The ON period of transistor 21 must be at least long enough to ensure that S.C.R. 5 fires and remains in the ON condition, typically between 10 and 20 microseconds though longer pulses are perfectly acceptable provided that they are not longer than a half-cycle of resonant oscillation. The OFF period of transistor 21 must be longer than the total time for which the capacitor 10 of FIGURE 1 carries current, and it may be desirable for the OFF period to be appreciably longer than this in order to minimise the losses in the circuit 3 of FIGURE 1. There is no lower limit to the frequency at which the pulses from the circuit of FIGURE 3 are applied to the S.C.R. 5 except those set by the application to which the static switching system is applied.

Figure 4:
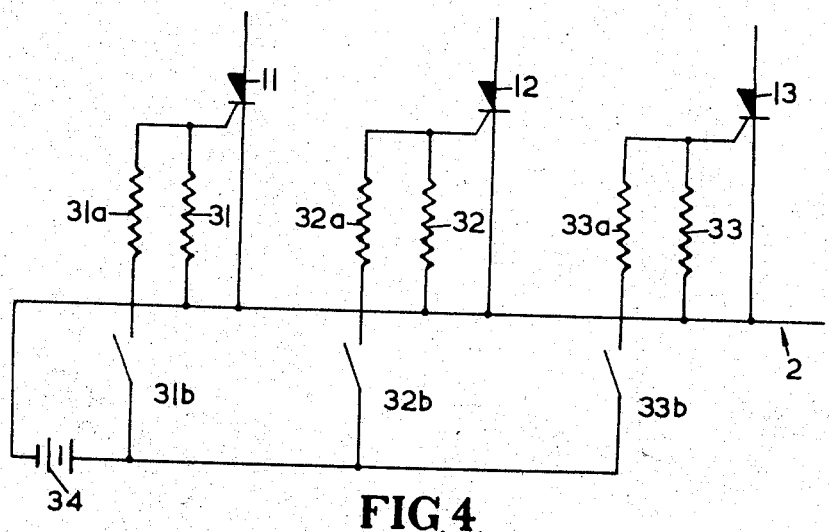
FIGURE 4 shows a control circuit for the gates of the load-controlling S.C.R.'s shown in FIGURES 1 and 2.

FIGURE 4 shows a very simple gate control system for the gate electrodes of the load-controlling S.C.R.'s 11, 12 and 13. The gates of these three S.R.C.'s are connected to the supply line 2 through resistors 31, 32 and 33, respectively, which ensure that the gates of these S.C.R.'s are maintained at cathode potential when the switches 31b, 32b and 33b are in the open condition. A positive signal can, however, be applied to any, or all of the gates of these S.C.R.'s by closing switches 31b, 32b or 33b which feed the output of the battery 34 through the current limiting resistors 31a, 32a and 33a. As soon as switch 31b is closed, gate currents will be fed into S.C.R. 11 which will therefore turn ON provided positive anode voltage exists. To switch S.C.R. 11 off, switch 31b is opened, and this removes the gate current from S.C.R. 11 which therefore continues to conduct only the next reversal of voltage of the supply line 6 of FIGURE 1 occurs. S.C.R.'s 12 and 13 operate in precisely the same way.

Instead of providing regularly-spaced triggering pulses in the manner described with reference to FIGURES 3 and 4, triggering pulses can be applied to S.C.R. 5 in the manner now described with reference to FIGURE 5.

Figure 5:
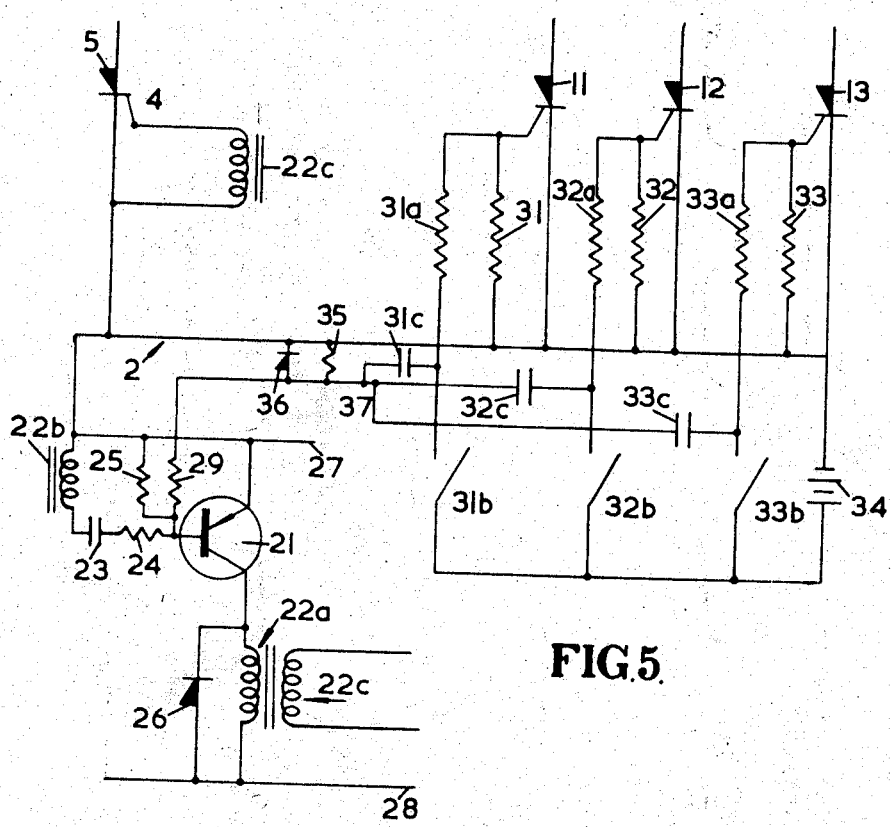
FIGURE 5 shows an alternative method of controlling a static switching system in accordance with the invention.

FIGURE 5 shows the same load-controlling S.C.R.'s 11, 12, and 13 as are illustrated in the previous figures. Additional capacitors 31c, 32c and 33c have been added so that when one or more of the switches 31b, 32b or 33b are opened a short negative pulse appears on the common terminal 37 of these three capacitors. This negative pulse is used to trigger a one-shot blocking-oscillator which differs from the one shown in FIGURE 3 only in that a PNP transistor has been used, and in that the resistor 25 has been connected to the supply line 27 instead of to the supply line 28. This change ensures that transistor 21 is always in the OFF state except when a negative trigger pulse is applied, through resistor 29, from the common terminal 37. When a negative pulse occurs the transistor blocking-oscillator will provide a single pulse to fire S.C.R. 5, thereby causing a reversal of the voltage to appear on line 6 of FIGURE 1 and allowing the S.C.R. 11, 12 or 13, from which the gate supply has been removed, to experience a negative anode voltage momentarily and thereby to recover its forward locking condition.

The control circuits shown in FIGURES 3, 4 and 5 are intended purely as examples so that a fully operational system is presented. Any other control circuits which have the same overall result could be used instead for operating on the gates of the S.C.R.'s shown in FIGURE 1.

What I claim as my invention and desire to secure by Letters Patent of the United States is:

1. A static switching system for selectively connecting a plurality of loads in parallel between the positive and negative lines of a D.C. supply, comprising a respective static switching device interposed between one of the D.C. supply lines and each load, and a single means interposed between both D.C. supply lines on the one hand and the loads with their respective static switching devices on the other hand to cause a reverse voltage to be applied to all of said respective static switching devices to turn them off and thereby inhibit current flow through said loads, said reverse voltage being of longer duration than the turn-off time of the one of said respective static switching devices last to achieve the turned-off condition.

2. A static switching system according to claim 1 in which the respective static switching devices are silicon controlled rectifiers.

3. A static switching system according to claim 1 in which the means for reversing the voltage applied to the respective static switching devices includes a choke in one of the D.C. lines, and means operable momentarily to connect the load end of said choke to the other D.C. line.

4. A static switching system according to claim 3 in which the means operable momentarily to connect the load end of the choke to the other D.C. line includes a silicon controlled rectifier connected between the load end of the choke and the said other D.C. line, and a series resonant circuit in parallel with said silicon controlled rectifier, said series resonant circuit such that the peak resonant current exceeds the maximum current flow through the choke.

5. A static switching system according to claim 1 in which the means for reversing the voltage applied to the respective static switching devices includes a choke winding in each of the D.C. lines, and means operable to connect the load ends of said windings together momentarily.

6. A static switching system according to claim 5 in which the two choke windings share a common core.

7. A static switching system according to claim 3 in which the means for reversing the voltage applied to the respective static switching devices includes a static switching device, and means for supplying said static switching device with trigger pulses at a substantially constant frequency.

8. A static switching system according to claim 5 in which the means for reversing the voltage applied to the respective static switching devices includes a static switching device, and means for supplying said static switching device with trigger pulses at a substantially constant frequency.

9. A static switching system according to claim 3 in which the means for reversing the voltage applied to the respective static switching devices includes a static switching device, and means for supplying said static switching device with a trigger pulse at the instant when any of the loads is to be disconnected from the D.C. supply.

10. A static switching system according to claim 5 in which the means for reversing the voltage applied to the respective static switching devices includes a static switching device, and means for supplying said static switching device with a trigger pulse at the instant when any of the loads is to be disconnected from the D.C. supply.

11. A static switching system for intermittently connecting a plurality of loads in parallel between the positive and negative lines of a D.C. supply, comprising static switching means interposed between the D.C. supply and the loads, said static switching means including a static switching device and means for providing regularly spaced trigger pulses to said static switching device whereby each trigger pulse causes said static switching means momentarily to make the positive D.C. line ends of the loads more negative than their negative D.C. line ends, and a respective static switching device connected in series between each load and the negative D.C. line to inhibit current flow through each load when its positive D.C. line end is more negative than the negative D.C. line, the period during which the positive D.C. line ends of the loads is made more negative than the negative D.C. line being longer than the period during which any of the static switching devices in series with the loads inhibits the flow of current therethrough.

12. A static switching system for intermittently connecting a plurality of loads in parallel between the positive and negative lines of a D.C. supply, comprising static switching means interposed between the D.C. supply and the loads, said static switching means comprising a choke in one of said D.C. supply lines, a silicon controlled rectifier connected between that end of said choke which is adjacent said loads and the other D.C. line, and a series resonant circuit in parallel with said silicon controlled rectifier and adapted to produce a peak resonant current which exceeds the maximum current flow through said choke, means for providing regularly spaced trigger pulses to said silicon controlled rectifier whereby each trigger pulse causes said static switching means momentarily to make the positive D.C. line ends of the loads more negative than their negative D.C. line ends, and a respective static switching device connected in series between each load and the negative D.C. line to inhibit current flow through each load when its positive D.C. line end is more negative than the negative D.C. line, the period during which the positive D.C. line ends of the loads is made more negative than the negative D.C. line being longer than the period during which any of the static switching devices in series with the loads inhibits the flow of current therethrough.

13. A static switching system for intermittently connecting a plurality of loads in parallel between the positive and negative lines of a D.C. supply, comprising static switching means interposed between the D.C. supply and the loads, said static switching means comprising a choke in one of said D.C. supply lines, a silicon controlled rectifier connected between that end of said choke which is adjacent said loads and the other D.C. line, and a series resonant circuit in parallel with said silicon controlled rectifier and adapted to produce a peak resonant current which exceeds the maximum current flow through said choke, means for providing regularly spaced trigger pulses to said silicon controlled rectifier whereby each trigger pulse causes said static switching means momentarily to make the positive D.C. line ends of the loads more negative than their negative D.C. line ends, and a respective silicon controlled rectifier connected in series between each load and the negative D.C. line to inhibit current flow through each load when its positive D.C. line end is more negative than the negative D.C. line, the period during which the positive D.C. line ends of the loads is made more negative than the negative D.C. line being longer than the period during which any of the silicon controlled rectifiers in series with the loads inhibits the flow of current therethrough.

14. A static switching system for intermittently connecting a plurality of loads in parallel between the positive and negative lines of a D.C. supply, comprising static switching means interposed between the D.C. supply and the loads, said static switching means comprising respective choke windings in said D.C. supply lines, a silicon controlled rectifier connected between those ends of said choke windings which are adjacent said loads, and a series resonant circuit in parallel with said silicon controlled rectifier and adapted to produce a peak resonant current which exceeds the maximum current flow through said choke windings, means for providing regularly spaced trigger pulses to said silicon controlled rectifier whereby each trigger pulse causes said static switching means momentarily to make the positive D.C. line ends of the loads more negative than their negative D.C. line ends, and a respective static switching device connected in series between each load and the negative D.C. line to inhibit current flow through each load when its positive D.C. line end is more negative than the negative D.C. line, the period during which the positive D.C. line ends of the loads is made more negative than the negative D.C. line being longer than the period during which any of the static switching devices in series with the loads inhibits the flow of current therethrough.

15. A static switching system for intermittently connecting a plurality of loads in parallel between the positive and negative lines of a D.C. supply, comprising static switching means interposed between the D.C. supply and the loads, said static switching means comprising respective choke windings in said D.C. supply lines, a silicon controlled rectifier connected between those ends of said choke windings which are adjacent said loads, and a series resonant circuit in parallel with said silicon controlled rectifier and adapted to produce a peak resonant current which exceeds the maximum current flow through said choke windings, including a static switching device and means for providing regularly spaced trigger pulses to said silicon controlled rectifier whereby each trigger pulse causes said static switching means momentarily to make the positive D.C. line ends of the loads more negative than their negative D.C. line ends, and a respective silicon controlled rectifier connected in series between each load and the negative D.C. line to inhibit current flow through each load when its positive D.C. line end is more negative than the negative D.C. line, the period during which the positive D.C. line ends of the loads is made more negative than the negative D.C. line being longer than the period during which any of the silicon controlled rectifiers in series with the loads inhibits the flow of current therethrough.

16. A static switching system for intermittently connecting a plurality of loads in parallel through a plurality of respective static switching devices to a single voltage reversing means, which is interposed between the D.C. supply for the loads and the loads with their respective static switching devices, said voltage reversing means including a capacitor and another static switching device, and causing a momentary reverse voltage derived from said capacitor to be supplied to each static switching device through a respective diode connected in parallel with its respective load, in order to turn said each static switching device off whenever a trigger pulse is applied to said other static switching device.

17. A static switching system for selectively connecting a plurality of loads in parallel between the positive and negative lines of a D.C. supply, comprising a respective static switching device interposed between one of the D.C. supply lines and each load, a single means, including a choke winding in each of the D.C. lines, interposed between both D.C. supply lines on the one hand and the loads with their respective static switching devices on the other hand to cause a reverse voltage to be applied to all of said respective static switching devices to turn them off and thereby inhibit current flow through said loads, said reverse voltage being of longer duration than the turn-off time of the one of said respective static switching devices last to achieve the turned-off condition, said means for reversing the voltage including means operable to connect the load ends of said windings together momentarily, and the means operable to connect together momentarily the load ends of the two choke windings including a silicon controlled rectifier connected between the load ends of the two choke windings, and a series resonant circuit in parallel with said silicon controlled rectifier, said series resonant circuit such that the peak resonant current exceeds the maximum current flow through the choke windings.

References Cited

UNITED STATES PATENTS

| | | | |
|---|---|---|---|
| 3,074,008 | 1/1963 | McPhail | 323—22 |
| 3,075,136 | 1/1963 | Jones | 321—45 |
| 3,146,356 | 8/1964 | Kidwell | 307—88.5 |
| 3,213,352 | 10/1965 | Faith | 321—45 |

ORIS L. RADER, *Primary Examiner.*

T. J. MADDEN, *Examiner.*